United States Patent

Maier et al.

[11] 4,189,269
[45] Feb. 19, 1980

[54] WORKPIECE TRANSPORT DEVICE

[75] Inventors: Karl Maier, Kuchen; Herbert Höhn, Göppingen, both of Fed. Rep. of Germany

[73] Assignee: L. Schuler GmbH, Fed. Rep. of Germany

[21] Appl. No.: 900,594

[22] Filed: Apr. 27, 1978

[30] Foreign Application Priority Data

Apr. 27, 1977 [DE] Fed. Rep. of Germany ....... 2718646

[51] Int. Cl.² ........................................... B65H 29/10
[52] U.S. Cl. ...................................... 414/19; 271/85; 294/86 R; 414/731; 414/753
[58] Field of Search ................. 214/1 BB, 1.7, 8.5 SS, 214/147 AS; 294/86 R, 88; 271/85, 267, 268; 198/486; 414/19, 731, 751, 753

[56] References Cited

U.S. PATENT DOCUMENTS

| | | | |
|---|---|---|---|
| 2,609,776 | 9/1952 | Sahlin | 294/88 X |
| 2,901,126 | 8/1959 | Halberstadt | 214/1 BB |
| 3,126,770 | 3/1964 | Wuppermann et al. | 214/1 BB |
| 3,412,995 | 11/1968 | Parups | 271/268 |
| 3,851,771 | 12/1974 | Hufford | 214/1 BB |

FOREIGN PATENT DOCUMENTS 467861  5/1975  U.S.S.R. ........................... 214/147 AS

*Primary Examiner*—L. J. Paperner
*Attorney, Agent, or Firm*—Craig and Antonelli

[57] ABSTRACT

A workpiece transport device which includes at least one gripper tong arrangement driven in comformity with a work rhythm of a machine tool which is required to be charged and/or discharged. The gripper tong arrangement grips a marginal area of the workpiece, transports the workpiece, and deposits the workpiece at another machine tool or workpiece depository. An extensible and retractable support slide is provided for supporting the workpiece in a transport phase by being displaced beneath the workpiece in parallel to the gripper tong arrangement.

14 Claims, 1 Drawing Figure

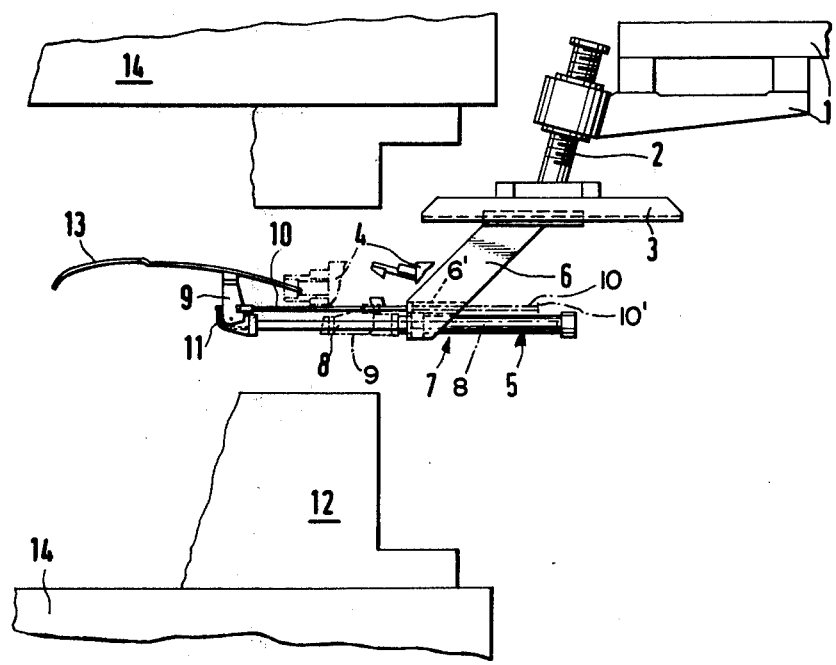

WORKPIECE TRANSPORT DEVICE

The present invention relates to a transport arrangement and, more particularly, to a workpiece transport device which includes at least one gripper tong means driven in conformity with a work rhythm of a machine tool with the gripper tong means gripping a workpiece in a marginal region thereof, transporting the workpiece, and subsequently depositing the workpiece.

Workpiece transport devices have been proposed, for example, in German Patent No. 852,039, Offenlegungsschrift No. 2,002,987, Auslegeschrift No. 1,172,637, and U.S. Pat. Nos. 2,677,342, 2,781,136 and 3,630,391, with such devices serving substantially for supplying and/or removing workpieces from machine tools such as, for example, presses, or for transporting the workpieces between the machine tools and/or presses.

One disadvantage of the proposed workpieces transport devices resides in the fact that workpieces having a relatively large surface area are difficult to handle because the workpieces are not sufficiently formally stable in themselves and tend to rattle or vibrate during transport and, more particularly, at high work repetition frequencies, thereby resulting in damage to the workpiece, the machine tool and/or the gripper tongs.

The aim underlying the present invention essentially resides in providing a workpiece transport device with which both small and large area workpieces can be handled and transported at high work repetition frequencies.

According to one advantageous feature of the present invention, a support slide means for supporting the workpiece in a transport phase by travelling beneath the workpiece is provided with the support slide means being selectively extensible or retractable and being displaceable in parallel to a gripper tong arrangement.

In accordance with another feature of the present invention, a variable position nose or projection is provided on a forward end of the slide means for supporting the workpiece during a transport operation.

To effect the retraction and extension of the slide means, according to the present invention, a selectively operable, double-acting cylinder piston unit is provided with the variable position nose or projection being provided at the front end of a piston rod of the cylinder piston unit.

In accordance with further features of the present invention, the support slide means may be arranged on a movable bracket carrying the gripper tongs. However, it is also possible according to the present invention to arrange the support slide means directly on the gripper tongs.

Advantageously, according to the present invention, the workpiece transport devices can be utilized in automated press lines, whereby workpieces of relatively small dimensions and relatively large dimensions can be machined in the press line without limiting the output of the press line by the size of the workpieces. In situations wherein the workpiece has a relatively small dimension, it is sufficient for the gripper tong means to solely act upon the workpiece. However, the situations wherein the workpiece is of a larger dimension, the slide means provides the necessary stability for the larger workpiece. Without the workpiece transport device of the present invention, with large dimensioned workpieces, the work repetition frequency would have to be reduced due to the instability of the workpieces themselves, thereby resulting in an uneconomical operation. Moreover, the same conditions also apply to individual presses with corresponding workpiece transport devices.

Accordingly, it is an object of the present invention to provide a workpiece transport device which avoids by simple means the drawbacks and disadvantages encountered in the prior art.

Another object of the present invention resides in providing a workpiece transport device which stabilizes the workpieces being transported so that a high-speed operation of the machine tool can be carried out, regardless of the relative sizes of the workpieces.

Yet another object of the present invention resides in providing a workpiece transport device which functions reliably under all operating conditions.

A further object of the present invention resides in providing a workpiece transport device which is simple in construction and, therefore, inexpensive to manufacture.

These and other objects, features and advantages of the present invention will become more apparent from the following description when taken in connection with the accompanying drawing which shows, for the purposes of illustration only, one embodiment in accordance with the present invention, and wherein:

The single FIGURE is a partially schematic side view of a workpiece transport device according to the present invention arranged at a press.

Referring now to the single FIGURE of the drawing, a workpiece transport device is provided which includes a bracket 1 connected, in a known manner, to a drive transmission (not shown) which, in turn, may be connected to a press drive (not shown). Retaining rails 3 are fixed to the bracket 1 by way of adjusting elements 2 which permit adjustable movement between the bracket 1 and the retaining rails 3. Gripper tongs 4 are mounted on the retaining rails 3 with the gripper tongs 4 being controllable, in a known manner, by cylinder piston units (not shown).

A support glide generally designated by the reference numeral 5 is provided between the gripper tongs 4 with the support slide 5 including means selectively displaceably movable in parallel to the gripper tongs 4. The support slide 5 is fixed to the retaining rail 3 by way of a fixing bracket 6. The support slide 5 includes a double-acting cylinder piston unit 7 having a piston rod 8 with a variable position nose 9 being fitted to the front end of the piston rod 8. The nose 9 is pivotally mounted at the end of the piston rod 8 and is pivotable through an angle of approximately 90°. The pivoting of the nose 9 is effected, on the one hand, by a stop or guide bar 10 in the extended end region and, on the other hand, by a spring 11. As shown in the drawing, the stop or guide bar 10 is slidably mounted in a bore 6' of the bracket 6 with one end of the bar 10 being pivotally mounted to the nose or projection 9. The stop bar 10 is provided with an end stop 10' which holds the bar 10 in the bore 6' at the end of the displacement of the piston rod 8 so that the nose 9 is pivoted upwardly. Upon retraction of the piston rod 8, the stop bar 10 is displaced to the position illustrated in phantom line, thereby causing the spring 11 to pivot the nose 9 into an essentially horizontal position. As readily apparent, the cylinder piston unit 7 is supplied with a pressure medium from a pressure source (not shown) with appropriate conventional control means (not shown) being provided for controlling the flow of the pressure medium to the cylinder piston unit 7 so as to cause displacement of the piston rod 8 to and from extended and retracted positions.

The support slide 5 is illustrated in an extended position and, in this position, the nose 9 occupies an upwardly pivoted position supporting the workpiece 13 resting upon a machine stand 12, which stand 12 is associated, for example, with a press 14.

The workpiece transport devices may be arranged between presses in a press line such as disclosed, for example, in Offenlegungsschrift No. 2,544,203 and copending, commonly assigned, U.S. application Ser. No. 729,175, now U.S. Pat. No. 4,125,072 so that the workpieces 13 are transported from press to press. After being machined by a tool of a press, the workpieces 13 are gripped in marginal regions by the gripper tongs 4 and are transported to a stand 12. If the workpieces 13 are narrow or have a relatively small dimension, no additional measures are necessary for gripping and transporting the processed workpieces 13. However, in the case of relatively large or wide workpieces 13 and a high working speed of the press line, the workpieces 13 tend to rattle during transport so that damage and faults can occur. To reliably prevent this occurrence, during production of relatively wide workpieces, the cylinder piston unit 7 is activated so as to displace the piston rod 8, whereby the support slide 5 travels beneath the workpiece 13 to be transported and supports the workpiece 13 by means of the nose 9 pivoted upwards in the terminal region.

While the support slide 5 is illustrated as being attached to the retaining rail 3 by way of a bracket 6, it is also possible in accordance with the present invention to arrange the support slide 5 directly on the gripper tongs 4 whereby, in case of a change-over of production, the necessary exchange of the tools in the presses and of the gripper tongs 4 would automatically involve the exchange of the associated support slides 5.

While we have shown and described only one embodiment in accordance with the present invention, it is understood that the same is not limited thereto, but is susceptible of numerous changes and modifications as known to one skilled in the art, and we therefor do not wish to be restricted to the details shown and described herein, but intend to cover all such changes and modifications as are encompassed by the scope of the appended claims.

We claim:

1. A workpiece transport device which includes at least one gripper tong means for gripping a workpiece in a marginal area and for transporting and depositing a gripped workpiece, the at least one gripper tong means being driven in conformity with a work rhythm of a machine tool required to be charged and/or discharged, characterized in that slide means are provided for supporting the workpiece during a transport phase, means are provided for selectively displacing said slide means in parallel to said at least one gripper tong means from a retracted position to an extended position beneath the workpiece, a variable position nose is pivotally mounted at an end of said slide means facing the workpiece, means are provided for normally biasing said nose into a first position, and in that means are operatively connected with said nose for pivoting said nose against said biasing means through an angle of about 90° to a second position.

2. A workpiece transport device according to claim 1, characterized in that said means for pivoting said nose includes a connecting rod having a first end mounted to the nose and a stop means provided at an opposite end thereof, said connecting rod being axially displaceably guided with said stop means being adapted to stop an axial displacement of the connecting rod when said slide means are displaced to an extended position thereby pivoting the nose into the second position.

3. A workpiece transport device according to claim 2, characterized in that said biasing means is formed as a spring.

4. A workpiece transport device according to one of claims 1, 2, or 3, characterized in that said means for selectively displacing said slide means includes a double-acting cylinder piston means.

5. A workpiece transport device according to claim 4, characterized in that an adjustable bracket means is provided for mounting the at least one gripper tong means, and in that a fixing bracket is provided for mounting the slide means on said adjustable bracket means.

6. A workpiece transport device according to claim 4, characterized in that the slide means are arranged directly on the at least one gripper tong means.

7. A workpiece transport device which includes at least one gripper tong means for gripping a workpiece in a marginal area and for transporting and depositing a gripped workpiece, the at least one gripper tong means being driven in conformity with a work rhythm of a machine tool required to be charged and/or discharged, characterized in that slide means are provided for supporting the workpiece during a transport phase, means are provided for selectively displacing said slide means in parallel to said at least one gripper tong means from a retracted position to an extended position beneath the workpiece including a double-acting cylinder piston means, and in that a variable position nose is provided at a forward end of said slide means.

8. A workpiece transport device according to claim 7, characterized in that an adjustable bracket means is provided for mounting the at least one gripper tong means, and in that a fixing bracket is provided for mounting the slide means on said adjustable bracket means.

9. A workpiece transport device according to claim 7, characterized in that said slide means is arranged directly on the at least one gripper tong means.

10. A workpiece transported device which includes at least one gripper tong means for gripping a workpiece in a marginal area and for transporting and depositing a gripped workpiece, the at least one gripper tong means being driven in conformity with a work rhythm of a machine tool required to be charged and/or discharged, characterized in that slide means are provided for supporting the workpiece during a transport phase, and in that means are provided for selectively displacing said slide means in parallel to said at least one gripper tong means from a retracted position to an extended position beneath the workpiece including a double-acting cylinder piston means.

11. A workpiece transport device according to claim 10, characterized in that an adjustable bracket means is provided for mounting the at least one gripper tong means, and in that a fixing bracket is provided for mounting the slide means on said adjustable bracket means.

12. A workpiece transport device according to claim 10, characterized in that said slide means is arranged directly on the at least one gripper tong means.

13. A workpiece transport device which includes at least one gripper tong means for gripping a workpiece in a marginal area and for transporting and depositing a gripped workpiece, the at least one gripper tong means being driven in conformity with a work rhythm of a machine tool required to be charged and/or discharged, characterized in that slide means are provided for supporting the workpiece during a transport phase, means are provided for selectively displacing said slide means in parallel to said at least one gripper tong means from a retracted position to an extended position beneath the workpiece, an adjustable bracket means is provided for mounting the at least one gripper tong means, and in that a fixing bracket is provided for mounting the slide means on said adjustable bracket means.

14. A workpiece transport device which includes at least one gripper tong means for gripping a workpiece in a marginal area and for transporting and depositing a gripped workpiece, the at least one gripper tong means being driven in conformity with a work rhythm of a machine tool required to be charged and/or discharged, characterized in that slide means are arranged directly on the at least one gripper tong means for supporting the workpiece during a transport phase, and in that means are provided for selectively displacing said slide means in parallel to said at least one gripper tong means from a retracted position to an extended postion beneath the workpiece.

* * * * *